April 10, 1962     A. SMITH ET AL     3,028,919
MOWER AND HOE
Filed Nov. 4, 1960     6 Sheets-Sheet 5
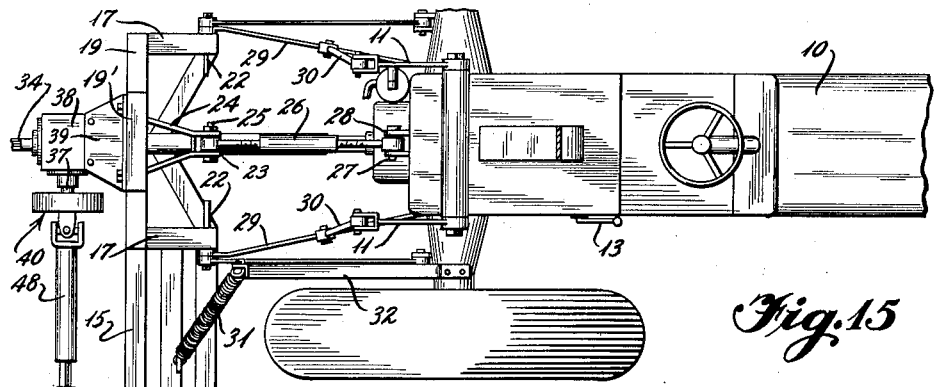
Fig. 15
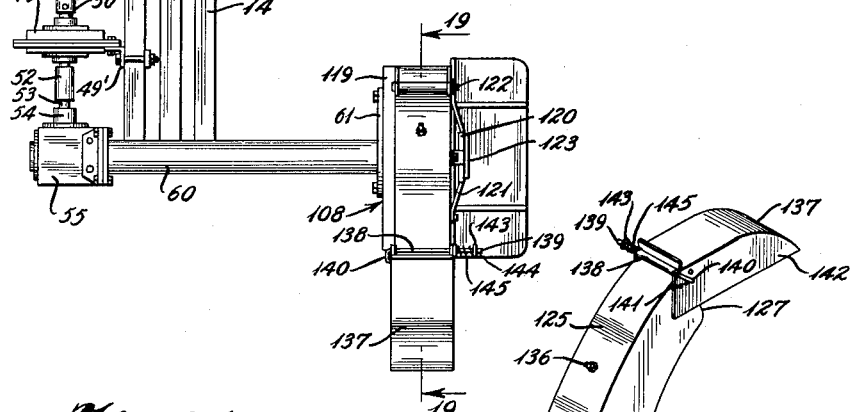
Fig. 16
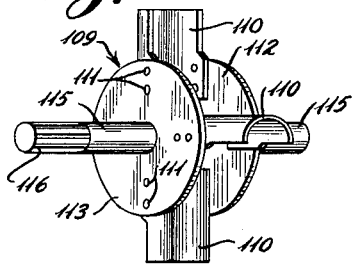
Fig. 21
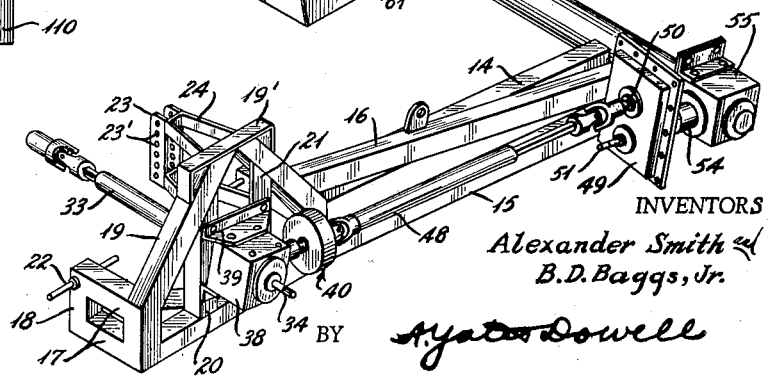
INVENTORS
Alexander Smith and
B. D. Baggs, Jr.
BY A. Yates Dowell
ATTORNEY April 10, 1962
A. SMITH ET AL
3,028,919
MOWER AND HOE
Filed Nov. 4, 1960
6 Sheets-Sheet 6
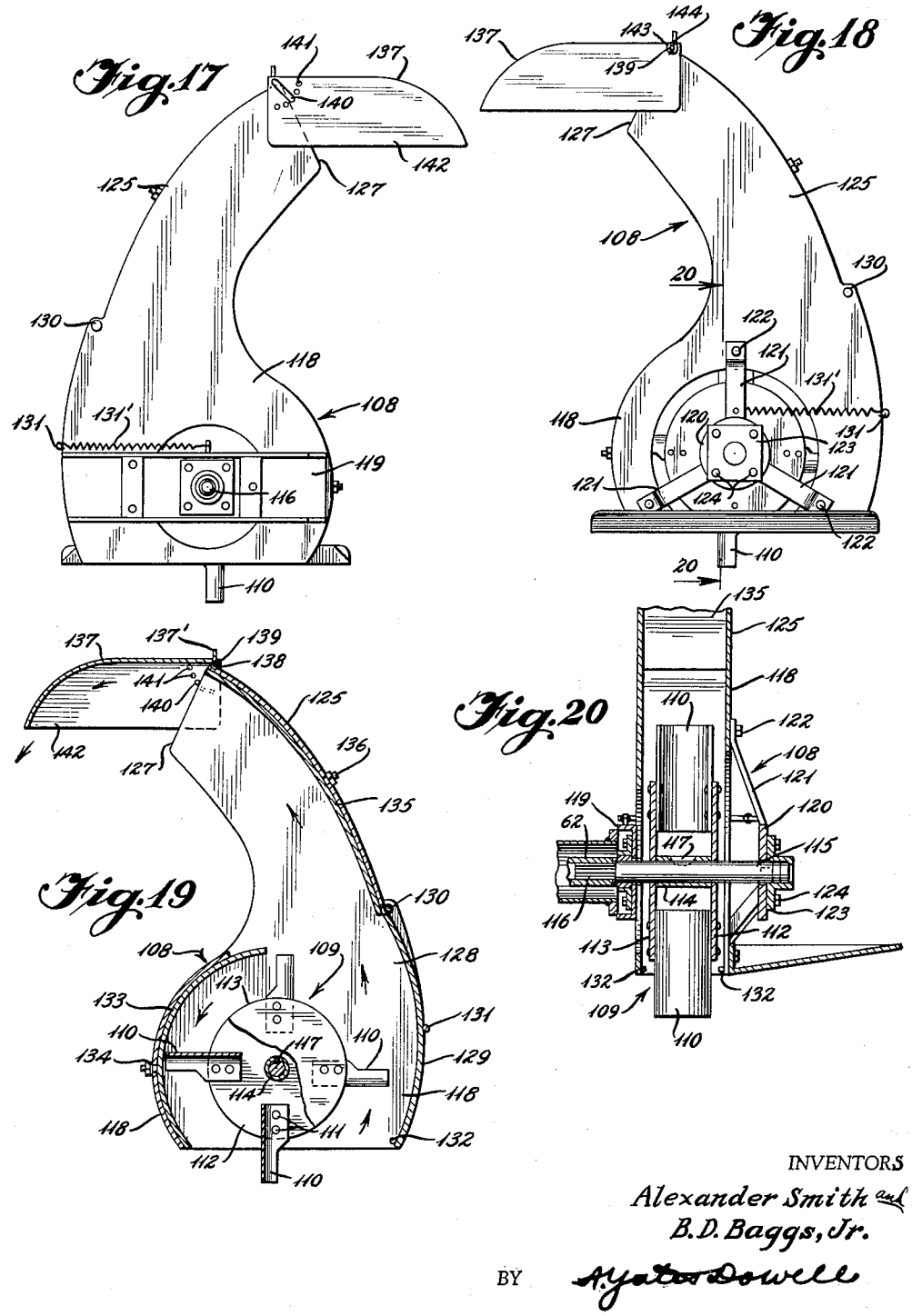
INVENTORS
Alexander Smith and
B. D. Baggs, Jr.
BY A. Yates Dowell
ATTORNEY

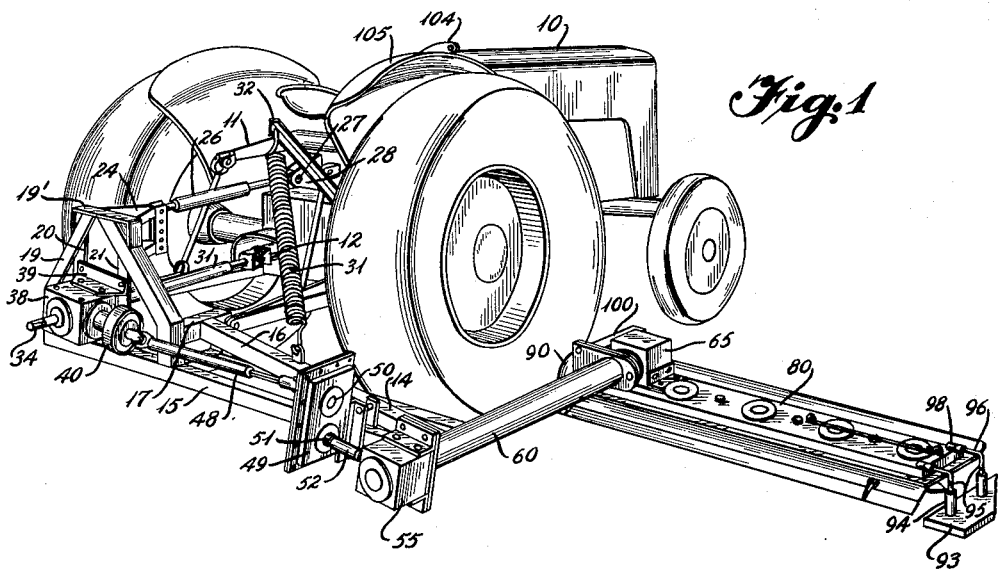
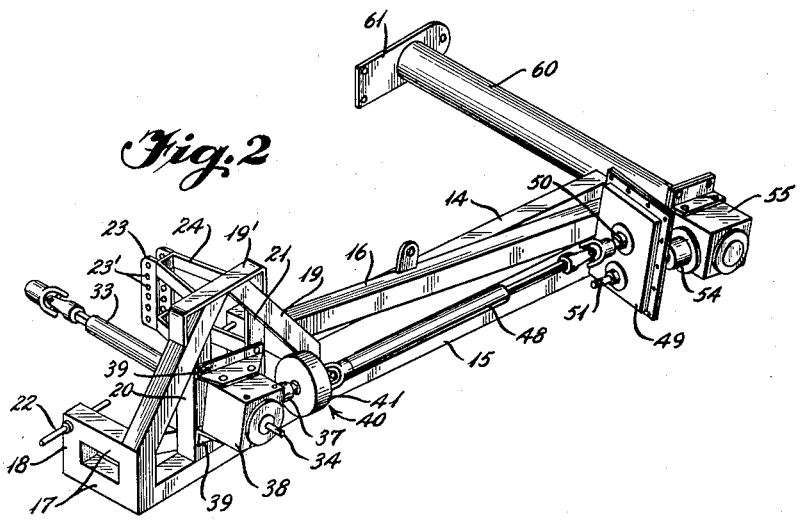
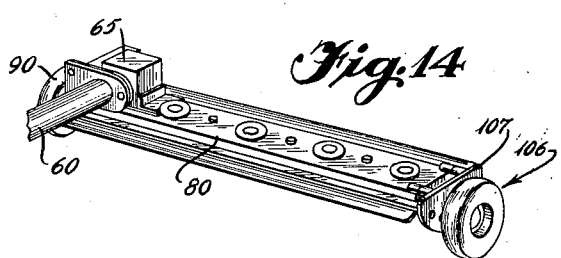

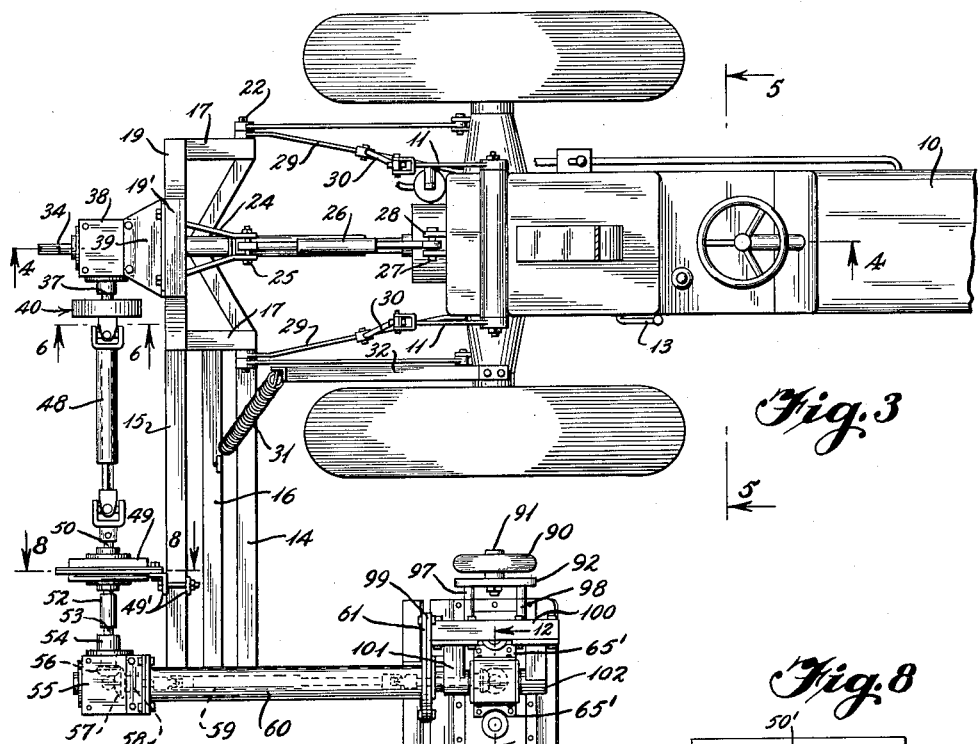

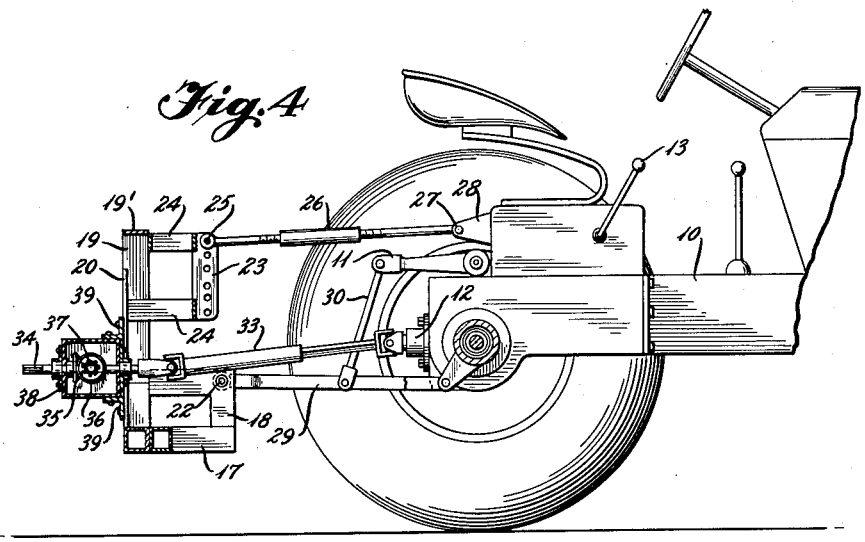
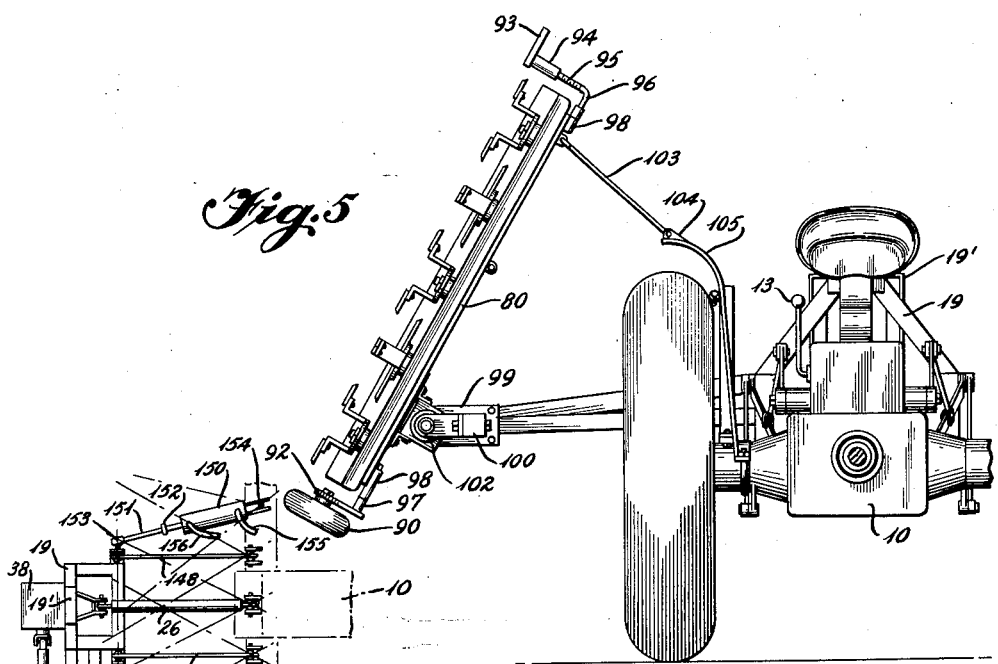
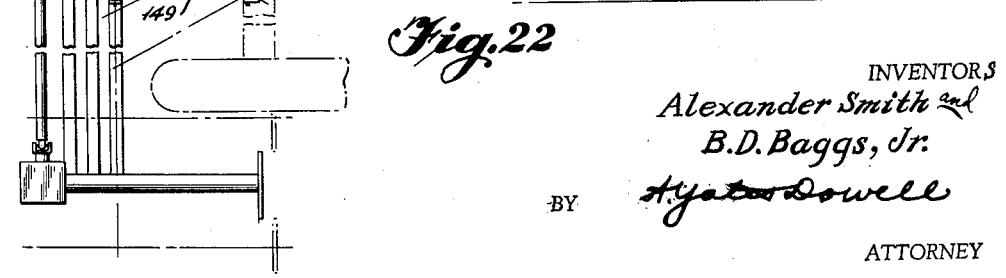

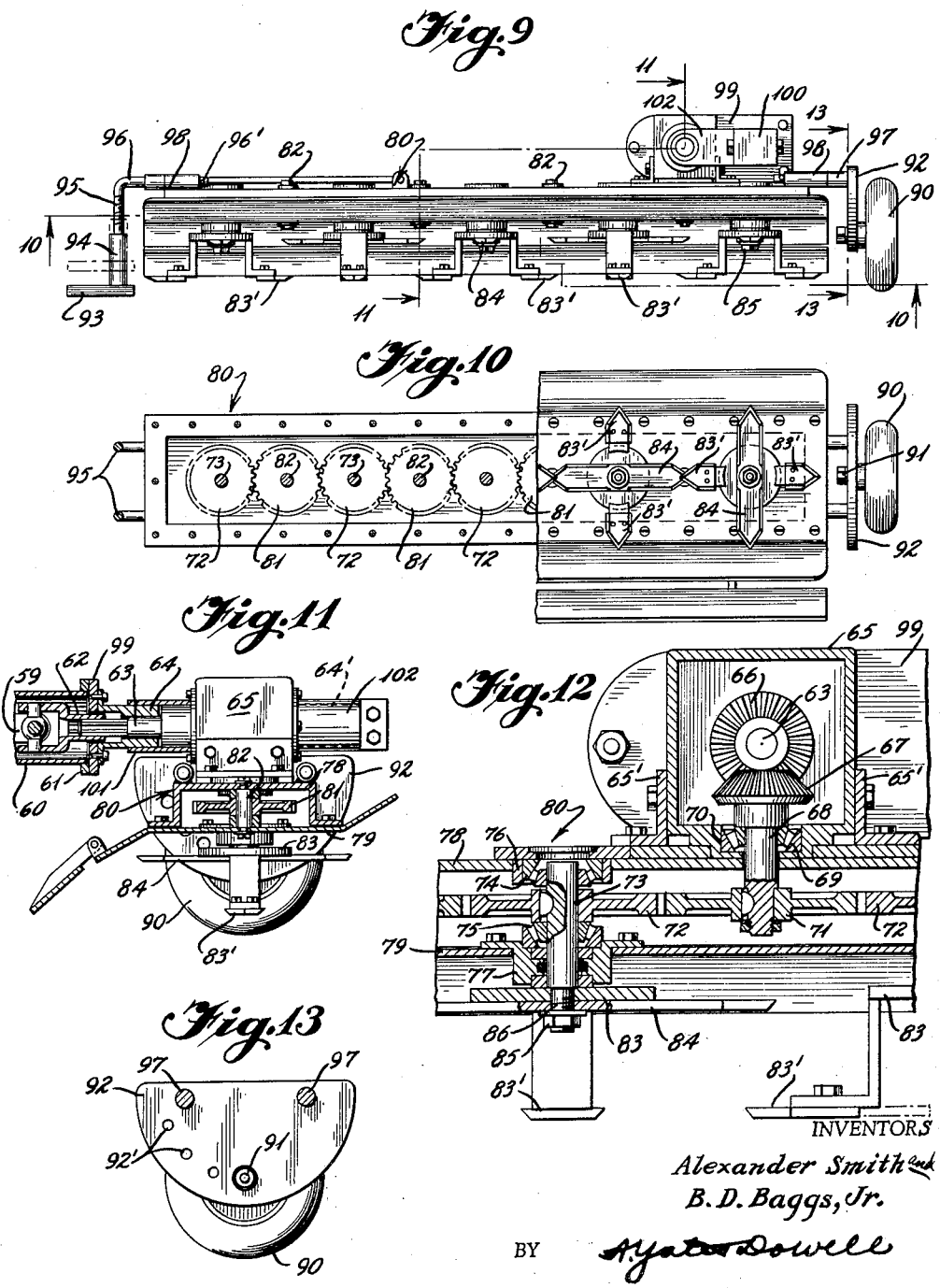

United States Patent Office 3,028,919
Patented Apr. 10, 1962

3,028,919
MOWER AND HOE
Alexander Smith, Box 1460, and Burton D. Baggs, Jr., 2429 Laurel Ave., both of Sanford, Fla.
Filed Nov. 4, 1960, Ser. No. 67,442
8 Claims. (Cl. 172—125)

This invention relates to the cultivation of plant life including small trees in orchards, groves, and other localities, and to the equipment employed including for cutting growth and for treatment of the soil after such growth has been cut or on which growth is absent.

This invention relates particularly to equipment for application to a tractor and to mechanism for mounting such equipment on the tractor in a manner to be properly supported and driven from the power takeoff of the tractor or any conveyor means with a power takeoff.

The cultivation of plant life including small trees has been done to a great extent with hand tools or by mechanical means not adapted for this work and consequently has been slow, expensive, and limited to small areas, with the result that attempts have been made to build mechanical devices to perform the necessary work, but such devices have been expensive, complicated, difficult, time consuming, and required special installation to install and remove since they did not fit conventional equipment, and their operation has been limited to areas free of vegetation and foreign matter.

It is an object of the present invention to provide a combination mower and hoe which is easy to operate and maintain, of practical durable and reliable construction, having means by which it may be readily installed or removed from a tractor, and which is suscepticle of use with different types of operating units.

Another object of the invention is to provide equipment of the above character including a reversible gear box by means of which it can be driven in either of two directions.

A further object of the invention is to provide apparatus of few working parts, easy to operate, and maintain, of small cost and a device applicable to a tractor in which the operating mechanism is kept substantially in line with the rear axle extended for encircling objects with a minimum radius and which device can be operated at different elevations and angles and by means of which damage to small trees and plants can be reduced to a minimum as well as a device which can be used to apply a bank or mound of earth at desired locations and distances from plants, trees and other objects.

A further object is to provide a mower and hoe unit having a plurality of cutter blades which may be rotated rapidly above the ground to mow vegetation or may be rotated more slowly below the ground level to remove undesirable vegetation.

Other objects and advantages of the invention will be apparent from the following description taken in conjunction with the accompanying drawings, in which:

FIG. 1 is a perspective illustrating one embodiment of the invention applied to a conventional tractor;

FIG. 2, a similar view of the mounting apart from the tractor;

FIG. 3, a top plan view;

FIG. 4, a section on the line 4—4 of FIG. 3;

FIG. 5, a section on the line 5—5 of FIG. 3;

FIG. 6, a section on the line 6—6 of FIG. 3;

FIG. 7, a section on the line 7—7 of FIG. 6;

FIG. 8, a section on the line 8—8 of FIG. 3;

FIG. 9, a front elevation of the cutter bar;

FIG. 10, a horizontal section on the line 10—10 of FIG. 9;

FIG. 11, a vertical section on the line 11—11 of FIG. 9;

FIG. 12, an enlarged fragmentary detail section of the driving connection to the cutter bar;

FIG. 13, a section on the line 13—13 of FIG. 9;

FIG. 14, a modified perspective of the cutter bar similar to that of FIG. 1 but with an adjustable supporting wheel instead of a skid;

FIG. 15, a top plan view of a modified type of hoe or digger with a directional discharge means associated therewith;

FIG. 16, a perspective thereof and of the mounting means therefor;

FIG. 17, an enlarged side elevation of the directional discharge means with the adjustable deflector;

FIG. 18, a similar view from the opposite side;

FIG. 19, a central longitudinal section on the line 19—19 of FIG. 15 through the directional discharge means;

FIG. 20, a section on the line 20—20 of FIG. 18;

FIG. 21, a perspective of the digger or excavator blades or scoops; and

FIG. 22, a fragmentary top plan view illustrating a further modification of the invention.

Briefly stated, the invention is a mower hoe or other operating unit and a three point hitch for mounting the same on a conventional tractor, which device can be readily detached or removed, driven from the power take-off of the tractor, raised and lowered and the pitch of the cut varied while so mounted on the tractor, and including a reversible gear box, a pneumatic clutch, a speed ratio changing gear box, and either with an adjustable skid or an adjustable wheel.

This invention is an improvement over the invention disclosed in our copending application Serial No. 5,061, now Patent No. 2,974,735, granted March 14, 1961.

With continued reference to the drawings, the invention is intended to be attached to a tractor 10 of conventional construction having spaced hydraulically operated lift arms 11, a power takeoff 12 subject to conventional control mechanism including a control lever 13.

A mounting frame is provided for the selective mounting of operating heads later to be described. Such mounting frame includes offset drive mechanism supported by a three-point hitch attached by suitable linkage to the hydraulic lift arms 11 of the tractor. The mounting frame or unit which supports the operating head comprises transverse generally parallel bars 14, 15 and 16 to which are attached spaced bars 17 by relatively short bars or frames 18 and with an inverted generally V-shaped or triangular frame or bracket 19 having an inverted U-shaped top brace 19' and a pair of upright braces 20, 21.

The upper inside corner portions of the frames 17 and 18 receive pivot pins 22 to form two parts of the three point hitch on the adjacent or remote sides of such frame members 17 and 18. The third hitch is provided by a pair of vertically disposed parallel plates 23 having a series of spaced cooperating openings 23' and such plates are mounted by spaced upper and lower brackets 24 on the inverted V-shaped bracket 19. The plates 23 are adapted to carry a bolt 25 which receives the eye of a threaded linkage sleeve 26 the opposite eye of which is mounted on a pivot 27 and a bracket 28 attached to a fixed portion of the tractor such linkage serving to control the relative position of the mounting frame and the operating head on the forward end of the same including the pitch of the latter.

The pivot pins 22 and the hydraulic lift arms 11 are connected by means of links 29 and 30 so that the raising and lowering of the mounting frame is in accordance with the raising and lowering of the lift arms 11 of the tractor. A stabilizing and counterbalancing spring 31 is provided and has one end attached to the bar 16 of the mounting frame and its other end attached to an angular bracket 32 mounted on the frame of the tractor 10.

With the structure described, when the lift arms 11 of the tractor are raised and lowered the mounting frame and attached equipment will be raised and lowered. The power takeoff 12 is connected to one end of a universal telescopic drive shaft 33 and the opposite end of such drive shaft is connected to a driven shaft 34 projecting from two sides of a gear box 38. The gear box 38 is reversible and either end of the shaft 34 is adapted to be connected to the universal telescopic drive shaft 33 to control the direction of rotation of the shaft 34. Shaft 34 has a bevel gear 35 (FIG. 4) fixed thereon which drives an intermeshing bevel gear 36 on a stub shaft 37 which projects from the side of the gear box 38 at right angles to shaft 34. Gear box 38 is mounted by brackets 39 to upright posts 20 and 21 on the inverted V-shaped frame 19.

The stub shaft 37 extends into a pneumatic clutch 40 (FIG. 7) including a housing 41 having a central splined sleeve 42 fixed thereto and in which sleeve the end of the stub shaft 37 is non-rotatably received.

Mounted to rotate upon the sleeve 42 is a clutch mounting collar and flange member 43 to which is attached by bolts 44 annular rims 45 for supporting a pneumatic tire 46 to which air is adapted to be supplied through conventional pneumatic valve means 47 to cause the tire to bear against the housing 41 so that the clutch member 43 will rotate with the stub shaft 37 but will permit slippage when the operating head strikes a solid object to prevent damage thereto.

The clutch member 43 is connected by a telescopic universal drive shaft 48 to a shaft 50 or a shaft 51 carried by a reduction gear box 49 mounted by brackets 49' on the transverse bar 15. The shaft 50 is keyed to a small gear 50' which meshes with a larger gear 51' attached to the shaft 51. When it is desired to use the operating mechanism as a mower, the telescopic drive shaft 48 is connected to the shaft 51 to impart a direct drive thereto. When the operating mechanism is to be used as a hoe, the drive shaft 48 is connected to the shaft 50 which drives the gear 50' and such gear drives gear 51' to impart a reduced drive to the shaft 51. The shaft 51 imparts a driving force to a spline coupling 52 which drives a shaft 53 extending through a bearing 54 into a gear box 55, the shaft 53 having a bevel gear 56 fixed thereon for driving a meshing gear 57 fixed on a shaft 58 substantially at right angles to the shaft 53 and extending to a telescopic drive shaft 59 located within a housing 60 connecting the gear box 55 to an elongated mounting flange 61.

The universal telescoping drive 59 terminates in an internally splined sleeve 62 (FIG. 11) in which is received a stub shaft 63 supported in a bearing 64, such stub shaft extending into a gear box 65 and having fixed thereon a bevel gear 66 for driving a meshing bevel gear 67 on a shaft 68 normal to the shaft 63 and mounted in a bearing 69 in an opening 70 in the bottom of the gear box 65. The shaft 68 depends beneath the gear box and has keyed thereto a spur gear 71 which drives cutter operating gears 72 mounted on upright stub shafts 73 carried in bearings 74 and 75 in bosses 76 and 77 mounted in the walls 78 and 79 of a cutter bar housing 80. A series of such stub shafts are employed.

The spur gear 71 is employed to drive two operating gears 72 on shafts 73 and each of such driven operating gears through an intermediate idler gear 81 drives additional operating gears mounted on shafts 73. The idlers 81 rotate freely about fixed shafts 82 in the cutter housing 80. A substantially U-shaped blade supporting member 83 is mounted on the lower end of each of the stub shafts 73 and carries a cutting blade 83' detachably mounted on the lower end of each leg of the member 83. If desired, such legs may be arcuate in cross section to decrease resistance while moving through the earth. Detachable leveling blades 84 may be mounted on the lower end of the shafts 73 beneath the U-shaped member 83 by nuts 85 and are adapted to level the surface of the earth when the cutting blades 83' are operating therein. When the device is operated in rocky ground, the cutting blades 83' may be replaced by a single cutter blade which extends across the member 83 and is connected to the lower extremity thereof as shown in phantom in FIG. 12.

The cutter bar is provided at its inner end (FIG. 13) with a supporting wheel 90 on a stub shaft 91, carried by a semi-circular bracket 92 having a series of holes 92' which receive the stub shaft 91 for adjusting the elevation of the wheel 90 relative to the cutter bar 80. The bracket 92 is mounted on the cutter bar 80 by a pair of prongs 97 having reduced end portions which are received within sleeves 98 welded or otherwise attached to the cutter bar housing. At its outer end the cutter bar is provided with an adjustable skid or shoe 93 with internally threaded bosses 94 in which the externally threaded ends 95 of L-shaped brackets 96 are received. The opposite ends of the brackets 96 are located in attaching sleeves 93 secured by welds or other fastening means to the cutter bar housing, and the brackets have retaining cotter pins 96' therein.

In use the device is readily attached to the drive means and supporting frame connected to a conventional tractor so that the cutter bar may extend outwardly in the line of the axle between the rear wheels extended in order to cut in a circle of relatively small diameter. With the cutter bar in operating position it will extend outwardly in the line with the center of the rear axle and in such position the angularity of the cutter bar housing may be varied as also will the pitch of the blades. The cutter bar housing may also freely rotate about the gear box mounted to allow opposite ends of the cutter bar housing to raise and lower to follow the terrain and its ends raised or lowered to vary the angle of the cutter bar housing end to end.

Gear box 65 is fastened to the top of the cutter bar housing 80 by L-shaped bracket 65' fixed thereto. The cutter bar assembly is connected to the drive housing 60 and mounting flange 61 by means of a mounting plate 99 fastened to flange 61 by bolts or other fastening means. The plate 99 is connected to a mounting bracket 100 which has spaced opposing sleeves 101 and 102 projecting therefrom and such sleeves are adapted to receive bearings 64 and 64' and to provide free rotation of the cutter unit about such bearings.

When the cutter bars are not in use and the tractor is to be moved from place to place, the operating head may be raised to an inoperative position by means of hydraulic lift arms 11 and rotated about sleeves 101 and 102. A hook or other linkage 103 is pivotally attached to the operating head and its free extremity or hook portion is adapted to engage a lug 104 secured to a fender 105 of the tractor to hold the operating head in such inoperative position without the use of hydraulic force.

By removing the skid or shoe assembly from the outer end of cutter housing 80 and replaced with an outer wheel unit 106 and mounting bracket 107 similar to the wheel 90 and bracket 92 mounted on the inner end of the housing the cutter unit is used as a mower only as shown in FIG. 14.

By removing the bolts which fasten the mounting plate 99 to the flange 61 the cutter bar housing may be detached and a different form of implement such as a hoe shown in FIGS. 15 through 21 may be applied.

The hoe device 108 comprises a rotating digger 109 having a plurality of semi-circular scoops 110 which may be any desired number, four being illustrated and spaced 90° apart. The scoops 110 are secured by bolts or other fastening means 111 between spaced disks 112 and 113 and such disks are spaced by sleeve 114 located centrally thereof and adapted to receive shaft 115 having a spline 116 at its inner end which is inserted into spline sleeve 62, shaft 115 being secured to rotary digger 109 by key 117 in sleeve 114.

Thus the digging unit will be driven from the power takeoff of the tractor. Hoe 108 is provided with a housing 118 mounted to flange 61 by means of a U-shaped bracket 119 fixed to one side of housing 118 the U-shaped bracket 119 having spaced braces to receive the fastening bolts. Mounted on the opposite side of the housing 118 is a disk 120 held in place by spaced mounting brackets 121 fastened to the housing 118 by bolts 122. A bearing 123 is attached to the disk 120 by bolts 124 and receives the free end of the shaft 115.

The housing 118 extends upwardly and curves outwardly from the tractor to provide a chute 125 so that when earth is forcibly thrown upwardly it may be variably deflected outwardly beyond the end 127 thereof. The lower inner wall of the housing 118 is provided with an opening 128 covered by a spring loaded back plate 129 for removing large objects. If a rock or other heavy object is thrown against plate 129, the latter will move outwardly to permit discharge of the rock, thus preventing damage to the housing. The back plate 129 is pivotally mounted on a pin 130 carried by the housing 118 and is provided with a rod 131 substantially midway thereof which projects outwardly beyond such plate. A spring 131' is connected to each end of the rod 131 and the opposite ends of the springs are connected to the housing 118 to maintain the lower end of the back plate 129 against a stop 132.

The lower outer periphery of housing 118 is provided with a removable inner liner 133 held in place by stud and nut 134. The upper portion of deflector 125 is also provided with a removable inner liner 135 held in place by stud and nut 136.

In order to direct the angularity or direction of discharge a baffle or deflector 137 is pivotally mounted above opening 127 in order to deflect the dirt in and around the object to be banked. A sleeve 138 is fixed to the upper end of chute 125 and a rod 139 extends through such sleeve to provide pivot means for the deflector. The rod 139 is provided with a substantially U-shaped end 140 which engages one of a series of openings 141 located in the side wall 142 of the deflector 137. The end 140 abuts the end 127 of the housing 118 to regulate the angle of the deflector 137 relative to such housing. The opposite end of the rod 139 is provided with a washer 143 mounted on such rod by a cotter pin 144 and a spring 145 is interposed between the washer 143 and the side of the deflector 137 to maintain the U-shaped end 140 in a selected opening 141. The upper inner edge of the deflector has a flange 137' to provide a stop for the deflector when not in use.

As illustrated in FIG. 22, the mounting structure previously described may be moved transversely of the tractor 10 by providing conventional sway bars 148 and 149 and the linkage sleeve 26 of the three-point hitch with ball and socket joints at each end thereof. An hydraulic cylinder 150 having an operating piston rod 151 with a length adjustment 152 thereon is provided and the end of the piston rod has a suitable pivotal connection such as a ball and socket joint 153. The cylinder is secured to the axle of the tractor 10 by a pivotal support 154 and is provided with lines 155 and 156 for the supply and return of the hydraulic fluid to the hydraulic cylinder whereby when hydraulic fluid is applied to one end of the cylinder the piston rod will be extended and will move the sway bars 148 and 149 and the mounting frame, with or without a work unit thereon, outwardly of the tractor and relative to an earth location. When hydraulic fluid is applied to the opposite end of the cylinder, the piston rod 151 will be retracted and the mounting frame moved inwardly to a desired position or until the length adjustment 152 abuts the cylinder and prevents further movement thereof.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for attachment to an agricultural tractor having a power take-off and lift arms, comprising (1) a generally L-shaped mounting frame having one leg adapted to be disposed transversely of the tractor with the other leg extending forwardly along the side of the tractor, means for connecting said mounting frame to the lift arms of the tractor, (2) a first drive shaft carried by said transverse leg and a second drive shaft carried by said forwardly extending leg, said first drive shaft having means for connecting one end thereof to the power take-off and means for drivingly connecting the other end to said second drive shaft, (3) a supporting flange means at the forward end of said forwardly extending leg, an operating unit, means for detachably connecting said operating unit to said supporting flange means, means for driving said operating unit from said second drive shaft, and (4) transmission means for driving said operating unit at different speeds comprising a gear box secured to said mounting frame and surrounding one of said drive shafts, reduction gears in said gear box and actuating means outside of said box for selectively driving said last named shaft either directly from said power take-off or through said reduction gears whereby said operating unit may be driven at the desired speed.

2. The structure of claim 1 in which said transmission means comprises a gear box secured to said mounting frame, one of said drive shafts havin a first extensible section and a second section extending through said gear box, a main gear in said gear box mounted on said second shaft section, a smaller gear meshing with said main gear and mounted on a stub shaft passing through said gear box, and means for selectively connecting said first shaft section either directly to said second shaft section or to said stub shaft whereby the second shaft section may be driven at different speeds depending on the type of operating unit which is connected to the mounting frame.

3. The structure of claim 1, in which one of said drive shafts has incorporated therein a pneumatic friction clutch for preventing slippage under excessive loads to prevent damage to the apparatus.

4. The structure of claim 1 in which the means for connecting the first drive shaft to the power take-off includes a gear box detachably carried by the mounting frame and having a shaft projecting from two sides thereof, said gear box being reversible so that either end of its shaft is connectible to the power take-off whereby said drive shaft may be driven in either direction.

5. The structure of claim 1 wherein the operating unit comprises an elongated housing supported to extend outwardly in a direction away from the tractor, a series of parallel stub shafts rotatably mounted in said housing, a cutter blade secured to the lower end of each of said stub shafts, and means for driving said stub shafts from the second drive shaft.

6. The structure of claim 5 in which the elongated housing is pivotally connected to the supporting flange means to freely rotate about a pivot parallel to the direction of travel, thereby to allow the housing to follow the contour of the ground.

7. The structure of claim 1 in which the operating unit comprises a rotary earth digging device, a housing about said digging device having an upwardly and outwardly disposed portion terminating in a discharge opening, means for attaching said housing to said supporting flange means, and said means for driving said digging device being operable at a sufficient speed to cause said digging device to pick up and project earth through said housing and dicharge opening.

8. Apparatus for attachment to an agricultural tractor having a power take-off and lift arms comprising (1) an elongated mounting frame, means for connecting the mounting frame to the lift arms of the tractor, (2) a drive shaft carried by said mounting frame, means at one end of said frame for connecting said drive shaft to the power take-off, means at the other end of said frame for supporting a rotary digger, said digger comprising a shaft arranged parallel to the direction of travel of the apparatus, scoops on said shaft, a housing about said scoops comprising a pair of side walls, an inner wall and an outer wall, said walls extending upwardly and terminating in a lateral discharge opening in a position to discharge earth in a direction away from said tractor substantially at right angles to the direction of travel of the apparatus, an opening in the lower portion of said inner wall above the bottom edge of said housing and between said side walls, a pivoted plate for covering said opening, yieldable means for normally holding said plate closed but permitting it to move outwardly for the discharge of heavy objects, means for securing the housing to said mounting frame, and means for rotating said scoop shaft from said drive shaft at a speed to cause said scoops to pick up and project earth through said housing and discharge opening.

References Cited in the file of this patent

UNITED STATES PATENTS

| | | |
|---|---|---|
| 1,198,589 | Shellaberger | Sept. 19, 1916 |
| 1,858,360 | Cruse | May 17, 1932 |
| 2,669,919 | Freeman | Feb. 23, 1954 |
| 2,749,824 | Friday | June 12, 1956 |
| 2,766,835 | Witt | Oct. 16, 1956 |
| 2,777,272 | Smith et al. | Jan. 15, 1957 |
| 2,830,515 | Zayco | Apr. 15, 1958 |
| 2,974,735 | Smith et al. | Mar. 14, 1961 |

FOREIGN PATENTS

| | | |
|---|---|---|
| 11,266 | Australia | Jan. 13, 1928 |
| 1,153,466 | France | Oct. 7, 1957 |
| 619,713 | Great Britain | Mar. 14, 1949 |
| 788,630 | Great Britain | Jan. 2, 1958 |